United States Patent
Dhanuka et al.

(10) Patent No.: US 11,210,450 B1
(45) Date of Patent: Dec. 28, 2021

(54) SYSTEMS FOR GENERATING INSTANCES OF VARIABLE FONTS

(71) Applicant: Adobe Inc., San Jose, CA (US)

(72) Inventors: Praveen Kumar Dhanuka, Howrah (IN); Nirmal Kumawat, Rajsamand (IN); Arushi Jain, Ashok Vihar (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/942,286

(22) Filed: Jul. 29, 2020

(51) Int. Cl.
*G06F 40/109* (2020.01)
*G06T 11/20* (2006.01)

(52) U.S. Cl.
CPC .......... *G06F 40/109* (2020.01); *G06T 11/203* (2013.01)

(58) Field of Classification Search
None
See application file for complete search history.

(56) References Cited

U.S. PATENT DOCUMENTS

| | | | | |
|---|---|---|---|---|
| 5,859,648 | A * | 1/1999 | Moore | G06K 15/02 345/471 |
| 6,678,410 | B1 * | 1/2004 | Phinney | G06K 15/02 382/181 |
| 8,718,367 | B1 * | 5/2014 | Schneider | G06K 9/2054 382/176 |
| 2016/0292275 | A1 * | 10/2016 | Talton | H04L 67/02 |
| 2017/0249292 | A1 * | 8/2017 | Constable | G06F 40/103 |
| 2017/0262414 | A1 * | 9/2017 | Pao | G06N 3/0454 |

OTHER PUBLICATIONS

"Pearson correlation coefficient—Wikipedia", Retrieved at: https://en.wikipedia.org/wiki/Pearson_correlation_coefficient—on May 28, 2020, 14 pages.
O'Donovan, Peter et al., "Exploratory Font Selection Using Crowdsourced Attributes", ACM Transactions on Graphics, Jul. 27, 2014, 9 pages.
Wang, Zhangyang et al., "DeepFont: Identify Your Font from an Image", Proceedings of the 23rd ACM international conference on Multimedia (MM '15). Association for Computing Machinery, New York, NY [retrieved Oct. 13, 2020]. Retrieved from the Internet <https://arxiv.org/pdf/1507.03196.pdf>., Jul. 12, 2015, 9 pages.

* cited by examiner

*Primary Examiner* — Jeffrey J Chow
(74) *Attorney, Agent, or Firm* — FIG. 1 Patents

(57) ABSTRACT

In implementations of systems for generating instances of variable fonts, a computing device implements a similarity system to receive input data describing attribute values of glyphs of an input font. The similarity system generates a custom instance of a variable font by modifying a value of a registered design axis of the variable font based on the attribute values. A similarity score is determined that describes a visual similarity between the custom instance of the variable font and the input font. The similarity system identifies an additional design axis of the variable font based on the similarity score and generates an instance of the variable font that is visually similar to the input font by modifying a value of the additional design axis.

20 Claims, 10 Drawing Sheets

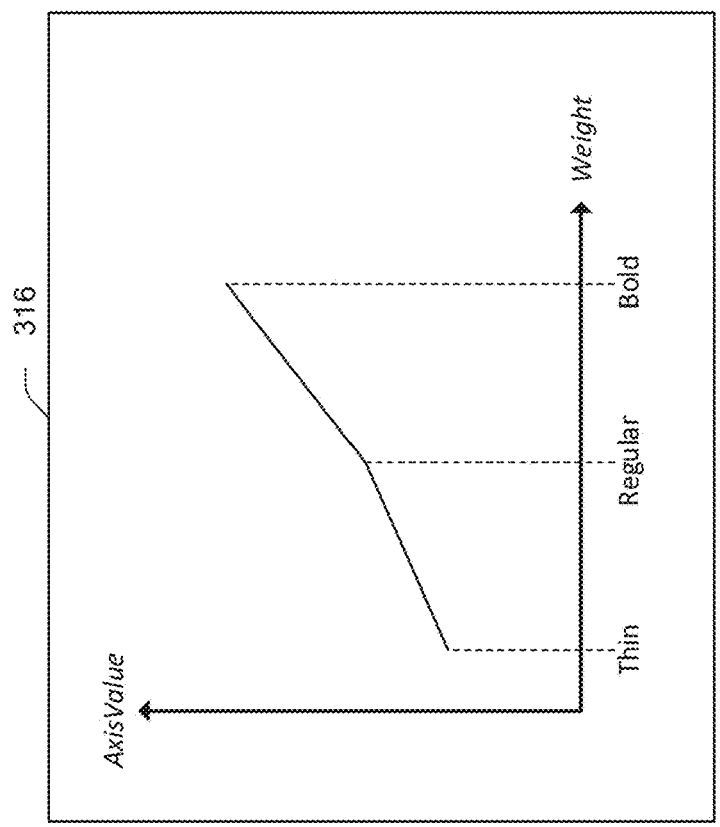
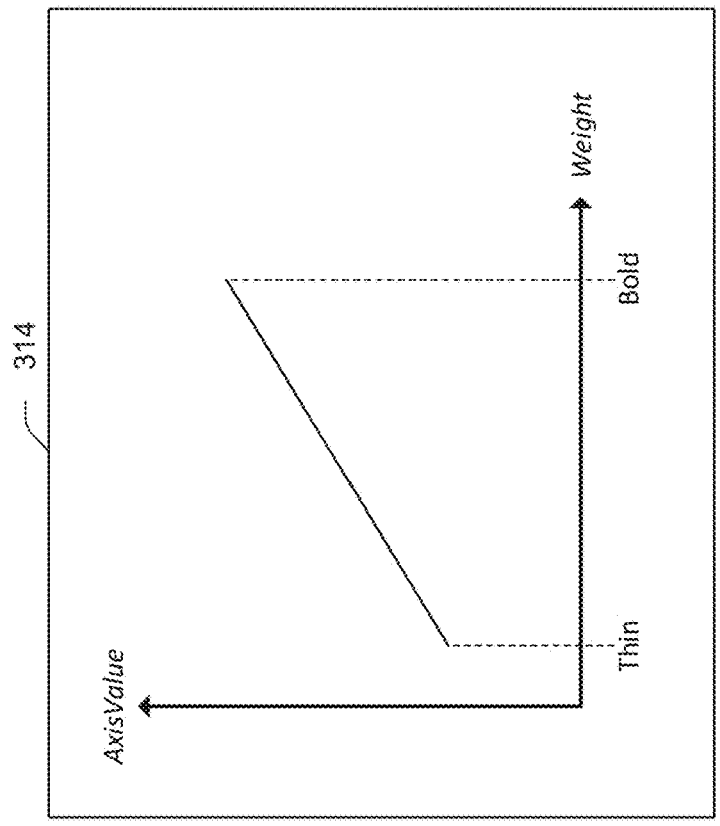
Fig. 3B

600

602
Receive a digital image depicting glyphs rendered using an input font

604
Determine attribute values of the glyphs depicted in the digital image

606
Generate a custom instance of a variable font by modifying a value of a design axis of the variable font based on the attribute values

608
Determine a similarity score indicating a visual similarity between the custom instance of the variable font and the input font

610
Identify an additional design axis of the variable font based on the similarity score

612
Generate an instance of the variable font that is visually similar to the input font by modifying a value of the additional design axis

Fig. 6

SYSTEMS FOR GENERATING INSTANCES OF VARIABLE FONTS

BACKGROUND

Text is one of the most important tools available to digital artists because it is usable to simultaneously convey a message based on a substance of the text and propagate a theme or a brand based on a visual appearance of the text. Digital content creation systems render glyphs of text using different fonts to change the visual appearance of the text depicted in digital content. In some scenarios, it is desirable to identify fonts based on a visual appearance of glyphs rendered using the fonts such as to identify fonts which are visually similar to a particular font. For example, the particular font may be a custom font which is not widely available. In this example, a digital artist desires a font that is visually similar to the particular font.

Conventional systems display multiple indications of fonts which are visually similar to the particular font, for example, to indicate available visually similar fonts if the particular font is not available. These visually similar fonts are determined based on similarity scores calculated from Euclidean distances between feature vector representations of the fonts. For example, if Euclidean distances are relatively small for feature vectors corresponding to first and second fonts, then the first font and the second font have a high similarity score and the first and second fonts are visually similar. Alternatively, if Euclidean distances are relatively large for the feature vectors corresponding to the first and second fonts, then the first font and the second font have a low similarity score and the first and second fonts are not visually simila.

Conventional systems, however, are not capable of identifying instances of variable fonts that are visually similar to the particular font. A variable font is a type of font that has a visual appearance which is changeable by modifying a value of a design axis of the variable font. For example, the variable font includes a default or a named instance and increasing and/or decreasing the value of the design axis generates instances of the variable font which are visually distinct from the default instance. Many variable fonts include multiple design axes such that each value of each design axis corresponds to a unique instance of the variable font. Because a single variable font is usable to generate a multitude of visually distinct instances of the single variable font, there is no specific instance of the variable font that is representative of the variable font for calculating a similarity score, for example, based on Euclidean distances.

SUMMARY

Systems and techniques are described for generating instances of variable fonts. In one example, a computing device implements a similarity system to automatically generate an instance of a variable font that is visually similar to an input font. For example, the similarity system receives input data describing attribute values of glyphs of the input font. The similarity system generates a custom instance of the variable font by modifying a value of a design axis of the variable font based on the attribute values of the glyphs of the input font.

A similarity score is determined that describes a visual similarity between the custom instance of the variable font and the input font. The similarity system identifies an additional design axis of the variable font based on the similarity score. For example, the similarity system identifies the additional design axis having a higher absolute value of correlation with the similarity score than other additional design axes of the variable font. The similarity system generates the instance of the variable font that is visually similar to the input font by modifying a value of the additional design axis.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIGS. 3A, 3B, and 3C illustrate an example of generating an instance of a variable font that is visually similar to an input font.

FIG. 6 is a flow diagram depicting a procedure in an example implementation in which a digital image depicting glyphs rendered using an input font is received and an instance of a variable font is generated that is visually similar to the input font.

DETAILED DESCRIPTION

Overview

Figure 1:
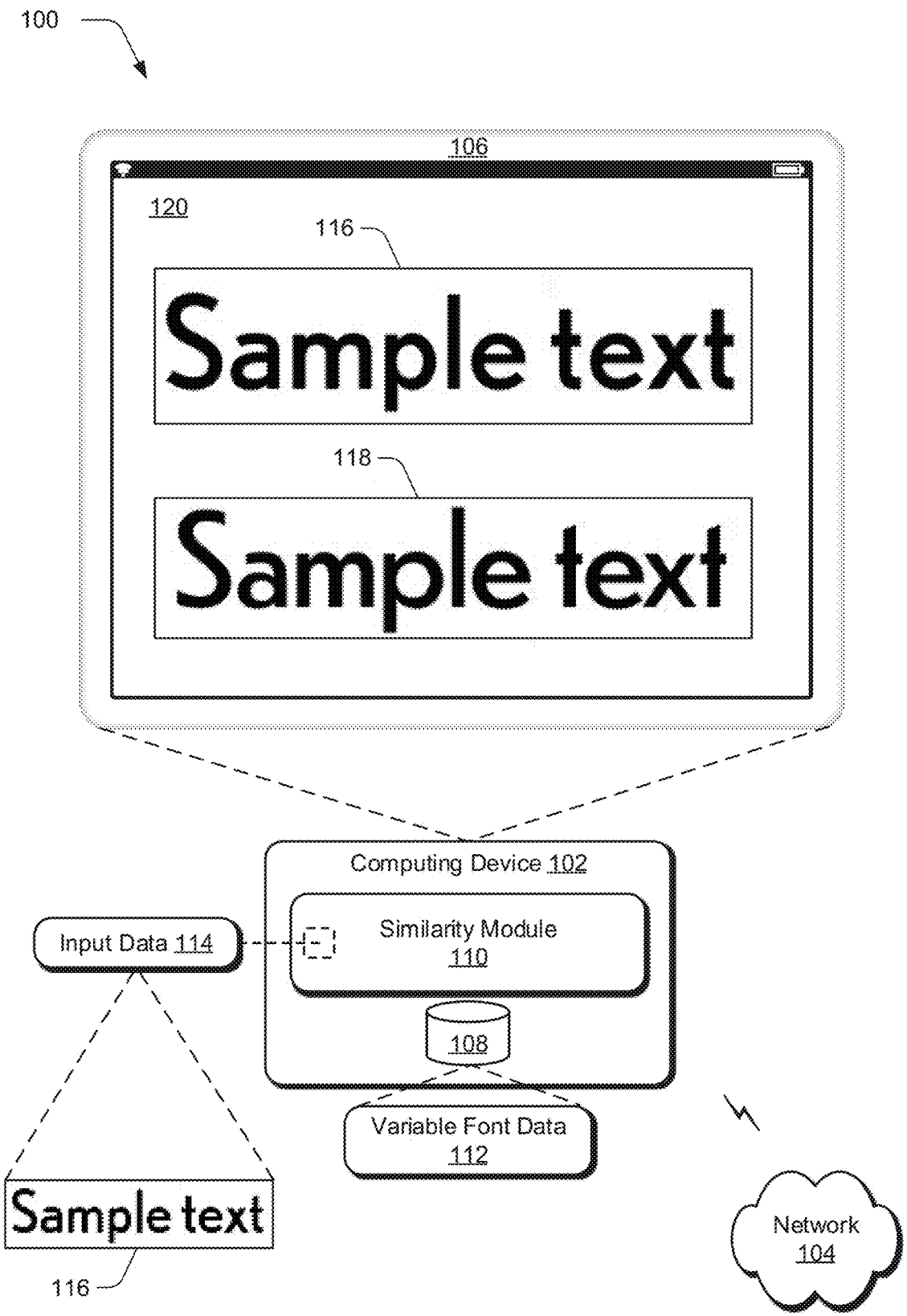
FIG. 1 is an illustration of an environment in an example implementation that is operable to employ digital systems and techniques for generating instances of variable fonts as described herein.

Conventional systems associate a first font and a second font as being visually similar fonts based on a similarity score that describes a visual similarity between the first and second fonts. These similarity scores are calculated from Euclidean distances between feature vector representations of the fonts. It is not possible to represent a variable font as a feature vector for comparison with a feature vector representation of another font. This is because the variable font is representative of a variety of visually distinct potential instances of the variable font.

Because conventional systems identify similar fonts by comparing feature vectors of the fonts, the conventional systems would require a feature vector representation of every possible instance of a variable font in order to determine if any of these instances are visually similar to an input font. Since a single variable font includes a theoretically unlimited number of unique instances, identifying a particular instance which is visually similar to the input font is impractical or impossible using conventional techniques.

In order to overcome these limitations, systems and techniques are described for generating instances of variable fonts. In an example, a computing device implements a similarity system to automatically generate an instance of a variable font that is visually similar to an input font. For example, the similarity system receives input data describing attribute values of glyphs of the input font.

The attribute values of the glyphs of the input font define visual features of these glyphs such as glyph weight, width, slant, optical size, and so forth. The similarity system processes variable font data describing a variable font and identifies a design axis of the variable font. In one example, the design axis is a registered design axis of the variable font such as an Italic axis, an Optical Size axis, a Slant axis, a Width axis, a Weight axis, and so forth. The similarity system determines a relationship between values of the design axis of the variable font and attribute values of glyphs rendered using instances of the variable font. The similarity system uses this relationship to identify a value of the design axis which corresponds to an attribute value of the glyphs of the input font.

The similarity system applies the identified value to the design axis and generates a first custom instance of the variable font. For example, glyphs rendered using the first custom instance have the attribute value of the glyphs of the input font. A first similarity score is determined that describes a visual similarity between the first custom instance of the variable font and the input font. The similarity system identifies an additional design axis of the variable font based on a correlation between values of the additional design axis and the first similarity score. In one example, the similarity system identifies the additional design axis from a plurality of other additional design axes as having axis values expected to affect the first similarity score to a greater degree than axis values of the plurality of other additional design axes. In this example, the similarity system selects the additional design axis as having a higher absolute value of correlation with the first similarity score than the plurality of other additional design axes.

The similarity system generates the instance of the variable font that is visually similar to the input font by modifying a value of the additional design axis. For example, the similarity system generates a second custom instance of the variable font using a median value of the additional design axis. A second similarity score is determined between the second custom instance of the variable font and the input font. The similarity system then uses a value of the additional design axis to a right of the median value and generates a third custom instance of the variable font.

A third similarity score is determined between the third custom instance of the variable font and the input font. If the third similarity score is greater than the second similarity score, then the similarity system continues evaluating values further to the right of the median value in this manner until a value of the additional design axis is identified which corresponds to a maximum similarity score. If the third similarity score is not greater than the second similarity score, then the similarity system evaluates values of the additional design axis to a left of the median value until the value is identified that corresponds to the maximum similarity score. The similarity system generates an instance of the variable font using the first custom instance and the value of the additional design axis corresponding to the maximum similarity score as the instance of the variable font that is visually similar font to the input font.

By generating instances of variable fonts in this manner, the described systems are capable of generating instances of a single variable font which are visually similar to multiple different input fonts. These visually similar fonts are usable in addition to the input fonts or in place of the input fonts. In this manner, the described systems can reduce computing resource consumption by representing multiple different input fonts using instances of a single variable font. For example, a single variable font file is usable to replace font files of multiple input fonts. Thus, a font file repository having many font files of different fonts is replaceable with a repository having a few variable font files and/or a single variable font file.

Term Examples

As used herein, the term "variable font" refers to a font that supports multiple font faces along at least one design axis.

As used herein, the term "design axis" refers to an axis of a variable font having a range of values which may be adjusted to modify an attribute of glyphs rendered using an instance of the variable font. By way of example, a design axis may be registered or unregistered. Examples of registered design axes include Italic, Optical Size, Slant, Width, Weight, etc. Examples of unregistered design axes include Serif, xHeight, Ascent, Descent, and so forth.

As used herein, the term "attribute" of a glyph refers to a visual feature of the glyph. Examples of attributes include weight, width, slant, optical size, etc.

As used herein, the term "instance" of a variable font refers to a font face corresponding to a particular position in a design-variation space of the variable font. By way of example, the font face of an instance of a variable font is usable to render glyphs of the variable font.

As used herein, the term "master" refers to a set of source font data that includes complete outline data for a particular font face.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 is configurable as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 can be representative of a plurality of different devices, such as multiple servers utilized by a business to perform operations "over the cloud."

The illustrated environment 100 also includes a display device 106 that is communicatively coupled to the computing device 102 via a wired or a wireless connection. A variety of device configurations are usable to implement the computing device 102 and/or the display device 106. The computing device 102 includes a storage device 108 and similarity module 110. The storage device 108 is illustrated to include variable font data 112.

The variable font data 112 describes a plurality of variable fonts available to the similarity module 110. For example, the variable font data 112 includes a font file for each of the plurality of variable fonts. These font files define design axes used by the variable fonts, adjustable ranges of the design axes, default or named instances of the variable fonts, and so forth.

The similarity module 110 is illustrated as having, receiving, and/or transmitting input data 114. The input data 114 describes glyphs of an input font 116. In one example, the input data 114 includes a digital image depicting glyphs rendered using the input font 116. In this example, the input font 116 may or may not be available to the similarity module 110. In an example, the input data 114 includes an electronic document having glyphs of text rendered using the input font 116. In another example, the input data 114 includes a font file corresponding to the input font 116. The input font 116 may be a non-variable font or an instance of a variable font.

As shown, the similarity module 110 processes the input data 114 to determine attributes of glyphs of the input font 116. In some examples, these attributes include a weight or a thickness of a stem of a glyph of the input font 116. In one example, the attributes of the glyphs include a width or a distance between origins of consecutive glyphs of the input font 116. For example, the attributes of the glyphs of the input font 116 include a slant or an angle between a vertical stem of a glyph and a y-axis of the glyph's bounding box.

The similarity module 110 also processes the variable font data 112 and identifies a design axis of a variable font such that values of the design axis are proportional to an attribute of glyphs of the variable font. To define a relationship between the design axis values and values of the attribute, the similarity module 110 determines attribute values of glyphs of a default or a named instance of the variable font. The similarity module 110 also determines a value or values of the design axis for the default instance of the variable font. By comparing the values of the design axis and corresponding values of the attribute of the glyphs, the similarity module 110 derives the relationship between the design axis values and the attribute values for the variable font.

In one example, the similarity module 110 determines whether the variable font uses a registered design axis such as an Italic axis, an Optical Size axis, a Slant axis, a Width axis, and/or a Weight axis. The similarity module 110 derives a relationship between registered axis values and corresponding glyph attributes for each registered design axis used by the variable font. Consider an example in which the variable font uses the Weight axis and the similarity module 110 derives a relationship between the Weight axis values and values of weights of glyphs of instances of the variable font. In this example, the vertical stem thickness or the weight of a glyph of the variable font is directly proportional to the values of the Weight axis. This relationship is also a function of a number of masters included in the variable font. For example, if the variable font includes multiple masters, then the relationship between the values of the Weight axis and the weights of the glyphs may be defined by multiple linear equations.

The similarity module 110 leverages the relationship between design axis values and the attribute values of the glyphs of the variable font to identify a design axis value that corresponds to an attribute value of the input font 116. The similarity module 110 applies the identified design axis value to the variable font and generates an instance of the variable font that is visually similar to the input font 116. Consider the previous example in which the similarity module 110 derives the relationship between the values of the Weight axis and the weights of the glyphs of the variable font. The similarity module 110 determines that glyphs of the input font 116 have a particular weight or vertical stem thickness. In this example, the similarity module 110 uses the relationship between the Weight axis values and the weights of the glyphs of the variable font to identify a value of the Weight axis which corresponds to the particular weight of the glyphs of the input font 116. The similarity module 110 uses the identified Weight axis value to generate an instance of the variable font with glyphs that also have the particular weight of the glyphs of the input font 116.

In the previous example, the similarity module 110 uses the relationship between the values of the Weight axis and the weights of the glyphs of the variable font to generate the instance of the variable font having glyphs with weights based on weights of glyphs of the input font 116. Thus, the generated instance of the variable font is visually similar to the input font 116 because the glyphs of the generated instance of the variable font have the weights of the glyphs rendered using the input font 116. In one example, the similarity module 110 determines a similarity score between the generated instance of the variable font and the input font 116.

To do so, the similarity module 110 generates or receives a latent representation of the input font 116 and a latent representation of the generated instance of the variable font. In an example, the similarity module 110 generates the latent representations of the input font 116 and the generated instance of the variable font using one or more convolutional neural networks. From these latent representations, the similarity module 110 extracts a feature vector describing a visual appearance of the input font 116 and a feature vector describing a visual appearance of the generated instance of the variable font. The similarity module 110 determines the similarity score by calculating a Euclidean distance between the feature vectors. In one example, a relatively small Euclidean distance corresponds to a relatively high similarity score whereas a relatively large Euclidean distance between the feature vectors corresponds to a relatively low similarity score.

Continuing the previous example, the similarity module 110 determines that the variable font also uses the Width axis. In this continued example, the similarity module 110 determines that the glyphs of the input font 116 have a particular width by processing the input data 114. The similarity module 110 also determines a relationship between values of the Width axis and widths of the glyphs of instances of the variable font. The similarity module 110 is implemented leverage the relationship between the values of the Width axis and corresponding widths of glyphs of instances of the variable font to identify a value of the Width axis corresponding to the particular width of the glyphs of the input font 116.

For example, the similarity module 110 uses the identified value of the Width axis to generate an instance of the variable font such that glyphs of the instance of the variable font have the particular width of the glyphs of the input font 116. In this example, the similarity module 110 applies the identified value of the Width axis to the instance of the variable font having glyphs with weights based on the weights of the glyphs of the input font 116. Thus, the generated instance of the variable font in this example has glyphs with weights based on weights of glyphs of the input font 116 and also has glyphs with widths based on widths of glyphs of the input font 116. For example, the generated instance of the variable font has glyphs with the particular weight and the particular width of the glyphs of the input font 116.

Continuing this example, the similarity module 110 determines that the variable font also uses the Slant axis. The similarity module 110 processes the input data 114 and determines that the glyphs of the input font 116 have a particular slant. The similarity module 110 also derives a relationship between values of the Slant axis and slants of glyphs of instances of the variable font. For example, the similarity module 110 leverages the relationship between the values of the Slant axis and corresponding slants of glyphs of instances of the variable font to identify a value of the Slant axis corresponding to the particular slant of the glyphs of the input font 116.

The similarity module 110 uses the identified value of the Slant axis to generate an instance of the variable font such that the glyphs of the instance of the variable font have the particular slant of the glyphs of the input font 116. In this example, the similarity module 110 applies this identified value of the Slant axis to the instance of the variable font having glyphs with the weights and widths of the glyphs of the input font 116. Accordingly, the generated instance of the variable font in this example has glyphs with the weights, widths, and slants of the input font 116. For example, the glyphs of the generated instance of the variable font have the particular weight, the particular width, and the particular slant of the glyphs of the input font 116.

The similarity module 110 determines a similarity score that describes a visual similarity between the input font 116 and the generated instance of the variable font with glyphs having the weights, widths, and slants of the glyphs of the input font 116. The similarity module 110 uses this similarity score to identify additional design axes of the variable font which are be usable to maximize the similarity score. In one example, the similarity module 110 evaluates the additional design axes of the variable font and selects an additional design axis of the variable font having a highest absolute value of correlation with the similarity score.

For example, the similarity module 110 uses correlation coefficients such as Pearson product-moment correlation coefficients to identify the additional design axis of the variable font having the highest absolute value of linear correlation with the similarity score. In another example, the similarity module 110 leverages cross-correlation calculations to identify the additional design axis of the variable font having the highest absolute value of correlation with the similarity score. In this manner, the similarity module 110 selects the additional design axis from the additional design axes as having axis values corresponding to visual features of instances of the variable font which are expected to affect the similarity score to a greater degree than axis values of the other additional design axes.

The similarity module 110 determines a value of the additional design axis which is expected to maximize the similarity score and uses this determined value to generate an instance of the variable font. For example, the similarity module 110 generates the instance of the variable font from the instance of the variable font with glyphs having the weights, widths, and slants of the input font 116. In one example, the similarity module 110 generates the instance of the variable font as a similar font 118.

Glyphs rendered using the similar font 118 are displayed in a user interface 120 of the display device 106 along with glyphs rendered using the input font 116. The input font 116 is a non-variable font in this example (e.g., Nobel Regular) and the similar font 118 is an instance of a variable font (e.g., Dunbar Series AP). As shown, the glyphs of the similar font 118 are visually similar to the glyphs of the input font 116. By determining relationships between values of glyph attributes and design axis values in this manner, the similarity module 110 is capable of generating instances of a single variable font which are visually similar to multiple different fonts described by the input data 114.

Figure 2:
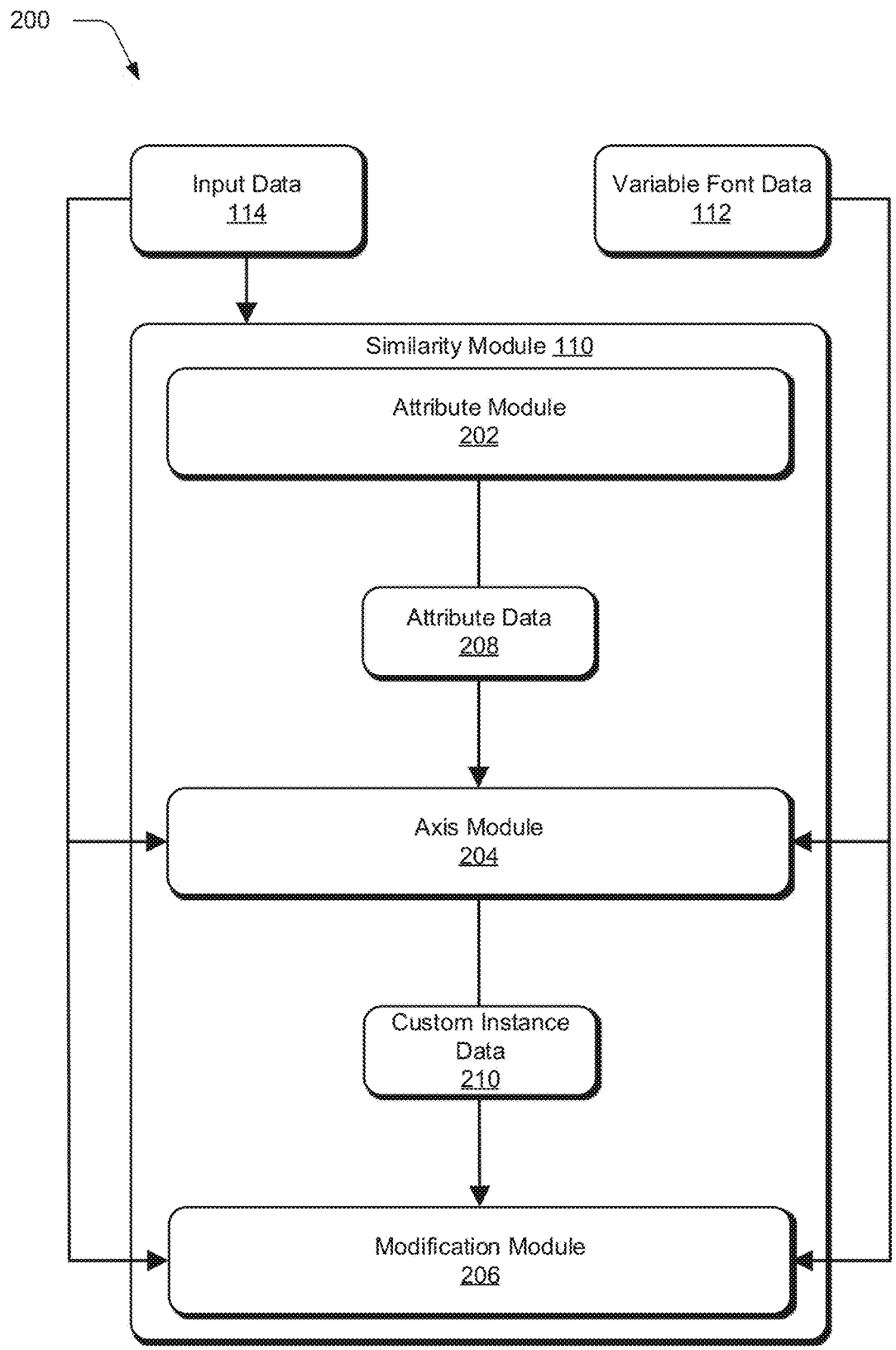
FIG. 2 depicts a system in an example implementation showing operation of a similarity module for generating instances of variable fonts.

FIG. 2 depicts a system 200 in an example implementation showing operation of a similarity module 110. The similarity module 110 is illustrated to include an attribute module 202, an axis module 204, and a modification module 206. As shown, the attribute module 202 receives the input data 114 and processes the input data 114 to generate attribute data 206. For example, the input data 114 describes glyphs of an input font and the attribute module 202 generates that attribute data 208 as describing values of attributes of the glyphs of the input font. In this manner, the attribute data 208 describes a weight value, a width value, and/or a slant value of the glyphs of the input font.

Figure 3A:
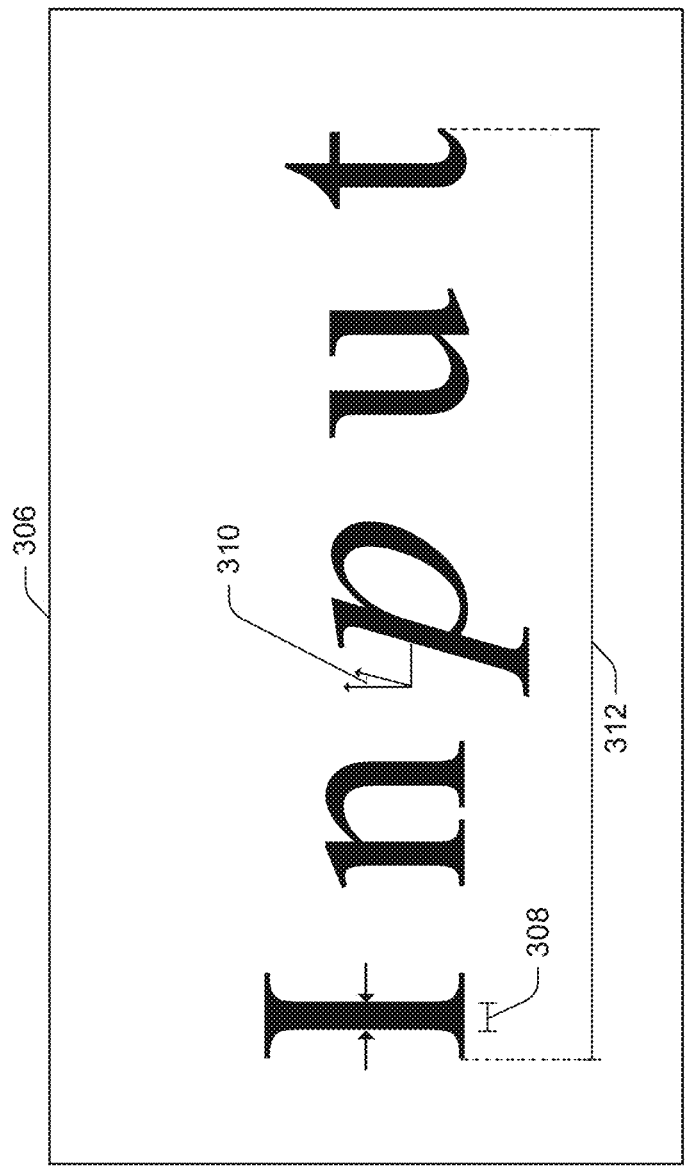
Figure 3C:
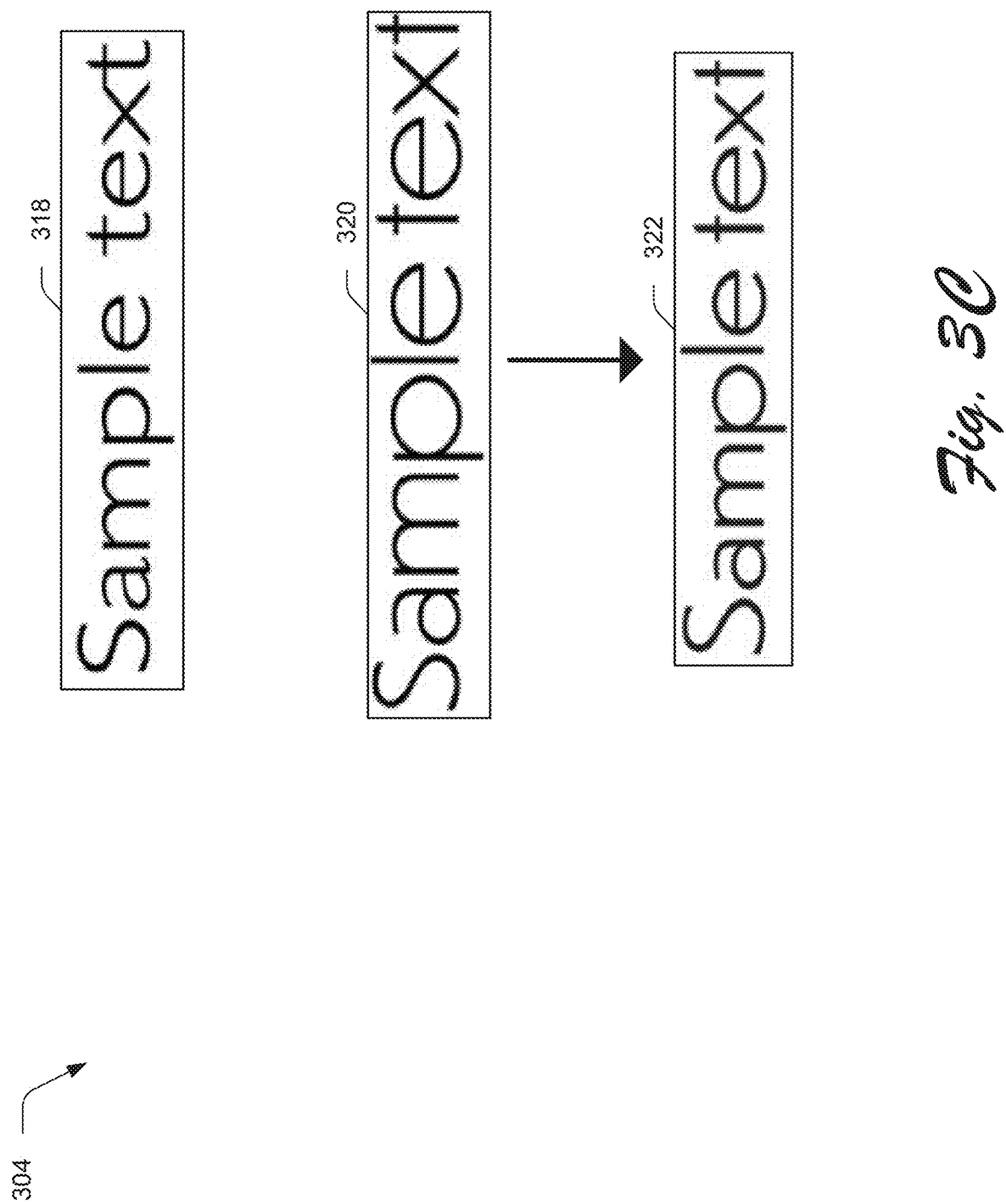

FIGS. 3A, 3B, and 3C illustrate an example of generating an instance of a variable font that is visually similar to an input font. FIG. 3A illustrates a representation 300 of determining glyph attributes of an input font. FIG. 3B illustrates a representation 302 of relationships between design axis values and glyph attribute values. FIG. 3C illustrates a representation 304 of a generating an instance of a variable font that is visually similar to the input font.

As shown in FIG. 3A, the representation 300 includes glyphs rendered using an example input font 306. The attribute module 202 processes the input data 114 to determine attribute values of the glyphs of the example input font 306. For example, the attribute module 202 determines a weight value 308 based on a thickness of a vertical stem of a glyph of the example input font 306. The attribute module 202 determines a slant value 310 based on an angle between a vertical stem and a y-axis of a bounding box of a glyph of the example input font 306. As illustrated, the attribute module 202 determines a width value 312 as a distance between origins of consecutive glyphs of the example input font 306. In this example, the attribute module 202 generates that attribute data 208 as describing the weight value 308, the slant value 310, and/or the width value 312 of the glyphs of the example input font 306.

The axis module 204 is illustrated as receiving the attribute data 208, the variable font data 112, and/or the input data 114. The axis module 204 processes the attribute data 208, the variable font data 112, and/or the input data 114 to generate custom instance data 210. In one example, the axis module 204 processes the variable font data 112 to derive relationships between values of attributes of glyphs of a variable font and registered design axis values of the variable font. For example, the axis module 204 determines relationships between values of the attributes of glyphs of the variable font and values of an Italic axis, an Optical Size axis, a Slant axis, a Width axis, and a Weight axis.

The representation 302 depicted in FIG. 3B illustrates examples of relationships between attribute values of glyphs and design axis values of variable fonts. In one example, these relationships may be expressed as:

$$\text{AxisValue} = k * \text{GlyphAttribute} + C$$

where: AxisValue is a value of a design axis; GlyphAttribute is a glyph attribute value; and k and C are constants.

It is to be appreciated that for a single glyph attribute (e.g., weight), the relationship between values of the single glyph attribute and values of the design axis of a variable font can include multiple linear equations with varying k and C constants based on a number of masters included in the variable font. This is illustrated by a first example 314 and a second example 316 of determined relationships between design axis values of the variable font and weight values of glyphs of instances of the variable font. The first example 314 illustrates a single linear relationship between the design axis values and the weight values for a variable font which is interpolated between first and second masters of the variable font (e.g., Thin and Bold). The second example 316 illustrates a relationship between the design axis values and the weight values for a variable font which includes multiple linear relationships. As shown, the second example 316 includes a first linear relationship interpolated between first and second masters (e.g., Thin and Regular) and a second linear relationship interpolated between second and third masters (e.g., Regular and Bold) of the variable font.

As illustrated in FIG. 2, the axis module 204 generates a first instance of the variable font by leveraging the Weight axis such that glyphs rendered using the first instance of the variable font have the weight value 308 determined from the glyphs of the example input font 306. The axis module 204 generates a second instance of the variable font by leveraging the first instance of the variable font and the Width axis such that glyphs rendered using the second instance of the variable font have the weight value 308 and the width value 312 determined from the glyphs of the example input font 306. The axis module 204 generates a third instance of the variable font using the second instance of the variable font and the Slant axis such that glyphs rendered using the third instance of the variable font have the weight value 308, the width value 312, and the slant value 310 determined from the glyphs of the example input font 306. In this example, the axis module generates the custom instance data 210 as describing the third instance of the variable font.

FIG. 3C illustrates the representation 304 which includes glyphs rendered using an input font 318. The attribute module 202 processes the input data 114 and determines attribute values of the glyphs rendered using the input font 318. The attribute module 202 generates the attribute data 208 as describing the attribute values of the glyphs of the input font 318. The axis module 204 receives the attribute data 208, the variable font data 112, and/or the input data 114 and processes the attribute data 208, the variable font data 112, and/or the input data 114 to generate an instance of the variable font 320.

As shown, the axis module 204 generates the instance of the variable font 320 as having a same weight value, a same width value, and a same slant value as the glyphs of the input font 318. In this example, the custom instance data 210 describes the instance of the variable font 320. As shown in FIG. 2, the modification module 206 receives the custom instance data 210, the variable font data 112, and/or the input data 114 as inputs. The modification module 206 processes the custom instance data 210, the variable font data 112, and/or the input data 114 and generates an instance of the variable font as a visually similar font 322.

To do so, the modification module 206 determines a similarity score between the input font 318 and the instance of the variable font 320. The modification module 206 uses this similarity score to identify additional design axes of the variable font which are be usable to maximize the similarity score. The modification module 206 identifies an additional design axis from the additional design axes as having a highest absolute value of correlation with the similarity score. For example, the modification module 206 uses correlation coefficients such as Pearson product-moment correlation coefficients to identify the additional design axis of the variable font having a highest absolute value of linear correlation with the similarity score. In an example, the modification module 206 leverages cross-correlation calculations to identify the additional design axis of the variable font having the highest absolute value of correlation with the similarity score.

In this manner, modification module 206 selects the additional design axis from the additional design axes as having axis values corresponding to visual features of instances of the variable font which are expected to affect the similarity score to a greater degree than axis values of the other additional design axes. The modification module 206 determines a value of the additional design axis which is expected to maximize the similarity score and uses this determined value to generate the visually similar font 322. For example, the modification module 206 generates visually similar font 322 from the instance of the variable font 320.

In order to determine the value of the additional design axis which is expected to maximize the similarity score, the modification module 206 generates an instance of the variable font using a median design axis value of the additional design axis. The modification module 206 computes a similarity score between this generated instance of the variable font and the input font 318. The modification module 206 then generates an additional instance of the variable font using a design axis value to a right of the median design axis value. For example, the modification module 206 increases the median value of the additional design axis and generates the additional instance of the variable font using the increased value of the additional design axis.

An additional similarity score is computed between the additional instance of the variable font and the input font 318. The modification module 206 compares additional similarity score to the previous similarity score. If the additional similarity score is greater than the previous similarity score, then the modification module 206 continues to generate additional instances of the variable font using design axis values further to the right of the median design axis value until a design axis value corresponding to a maximum similarity score is identified. For example, the modification module 206 continues to increase the value of the additional design axis until the design axis value corresponding to the maximum similarity score is identified.

If the additional similarity score is less than the previous similarity score, then the modification module 206 generates a second additional instance of the variable font using a design axis value to a left of the median design axis value. For example, the modification module 206 decreases the median value of the additional design axis and generates the second additional instance of the variable font using the decreased value of the additional design axis. The modification module 206 then computes a second additional similarity score between the second additional instance of the variable font and the input font 318. If the second additional similarity score is greater than the previous similarity score, then the modification module 206 continues to generate additional instances of the variable font using design axis values further to the left of the median design axis value until the design axis value corresponding to the maximum similarity score is identified. For example, the modification module 206 continues to decrease the value of the additional design axis until the design axis value corresponding to the maximum similarity score is identified.

By identifying the design axis value corresponding to the maximum similarity score in this "greedy" approach, the modification module 206 reduces a computational cost to identify the design axis value relative to a "brute force" approach. In one example, this may be represented as:

$$Cost_{BF}=O(n^m)$$

where: $Cost_{BF}$ is a computational cost of a "brute force" approach in which a feature vector is generated for each possible unique instance of a variable font to identify a design axis value corresponding to a maximum similarity score that describes a visual similarity between an instance of the variable font and an input font; n is a number of design axes of the variable font; and m is a number of available values of each axis of the design axes of the variable font (e.g., on an average basis).

$$Cost_G=O(n*m)$$

where: $Cost_G$ is a computational cost of a "greedy" approach in which feature vector similarity is used to identify the design axis value corresponding to the maximum similarity score; n is the number of design axes of the variable font; and m is the number of available values of each axis of the design axes of the variable font.

Continuing the previous example, the modification module 206 identifies multiple additional design axes having high absolute values of correlation with the similarity score. For example, the modification module 206 uses correlation coefficients such as Pearson product-moment correlation coefficients to identify a second additional design axis of the variable font having a next highest absolute value of linear correlation with the similarity score. In order to determine the value of the additional design axis which is expected to maximize the similarity score, the modification module 206 generates an instance of the variable font using a median design axis value of the second additional design axis. The modification module 206 computes a similarity score between the generated instance of the variable font and the input font 318. As in the previous example, the modification module 206 generates instances of the variable font using design values to a right and/or a left of the median design axis value until the design axis value corresponding to the maximum similarity score is identified.

The modification module 206 continues to identify additional design axes and determines values of the identified additional design axes which correspond to a maximum similarity score. In an example in which the variable font has many additional design axes, the modification module 206 identifies a subset of the additional design axes for determining values that maximize the similarity score such as subset of design axes used by named or default instances of the variable font. For example, the modification module 206 identifies the subset of the design axes as including design axes determined to have high absolute values of correlation with the similarity score.

The modification module 206 generates a refined instance of the variable font by determining additional design axes of the variable font as having high absolute values of correlation with a similarity score, and then determining axis values of these design axes which maximize the similarity score. The refined instance of the variable font is generated using these determined axis values. For example, the modification module 206 determines a similarity score between the refined instance of the variable font and the input font 318. In one example, the modification module 206 generates the refined instance of the variable font as the visually similar font 322. In another example, the modification module 206 modifies values of the registered design axes of the variable font to improve a visual similarity between the refined instance of the variable font and the input font 318. In this example, the modification module 206 modifies values of the registered design axes of the variable font to further refine the refined instance of the variable font such as to compensate for added noise. In this manner, the modification module 206 generates the further refined instance of the variable font by modifying a value of the Weight axis, the Width axis, the Slant axis, and so forth. The modification module 206 generates the further refined instance of the variable font as the visually similar font 322 in this example. In one example, the modification module 206 includes an output module to output the visually similar font 322 the user interface 120 such as by rendering the visually similar font 322 in the user interface 120.

As illustrated above, the described systems reduce the computational cost to identify the design axis value corresponding to the maximum similarity score from a cost that increases exponentially to a cost that increases multiplicatively. Additionally, the described systems are capable of generating instances of a single variable font which are visually similar to multiple different input fonts. In this manner, the described systems can reduce computing resource consumption by representing multiple different input fonts using instances of a single variable font. For example, a single variable font file is usable to replace font files of multiple input fonts. Thus, a font file repository having many font files of different fonts is replaceable with a repository having a few variable font files and/or a single variable font file.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

Figure 4:
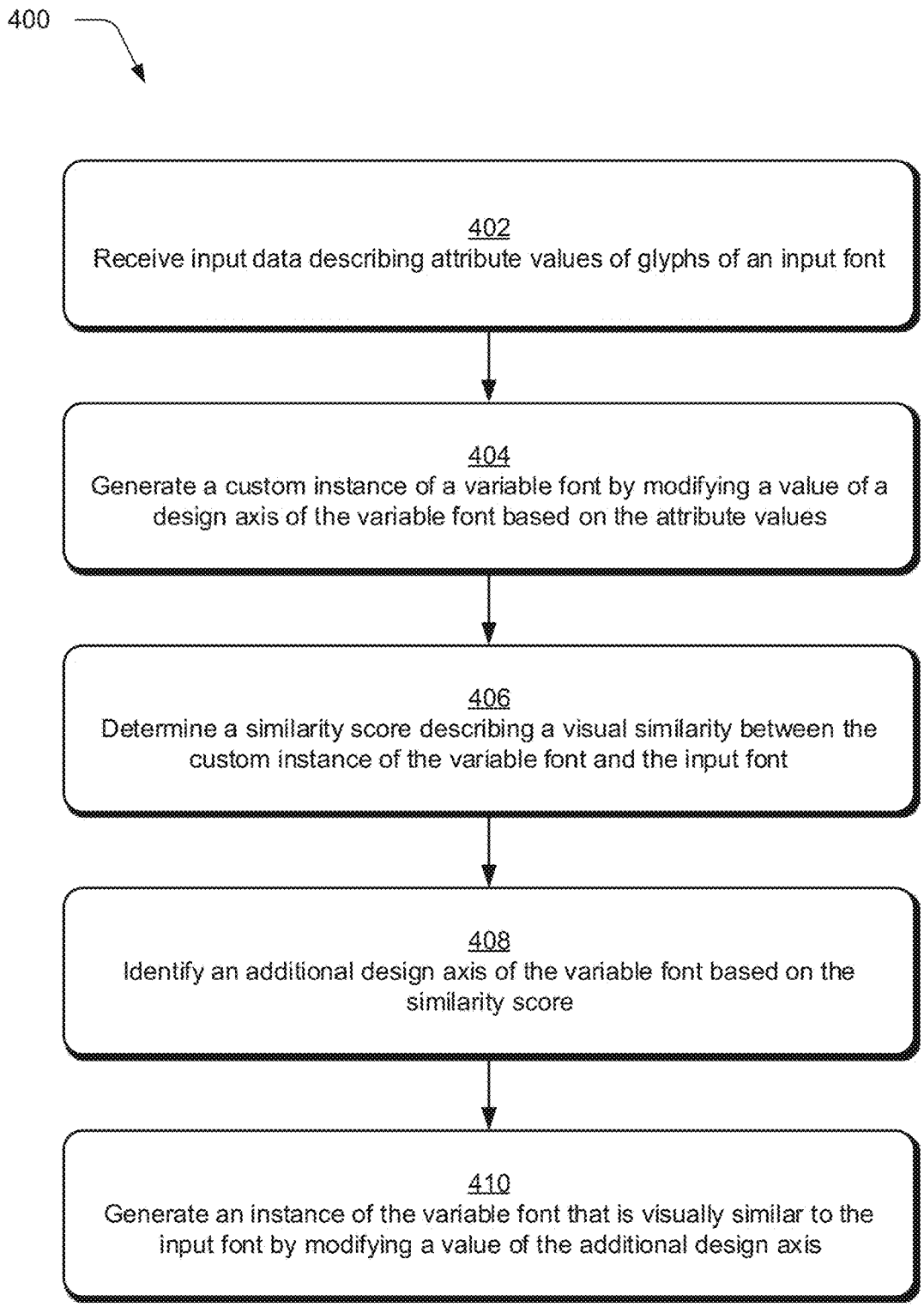
FIG. 4 is a flow diagram depicting a procedure in an example implementation in which input data describing attribute values of glyphs of an input font is received and an instance of a variable font is generated that is visually similar to the input font.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-3. FIG. 4 is a flow diagram depicting a procedure 400 in an example implementation in which input data describing attribute values of glyphs of an input font is received and an instance of a variable font is generated that is visually similar to the input font.

Input data describing attribute values of glyphs of an input font is received (block 402). In one example, the computing device 102 implements the similarity module 110 to receive the input data describing the attribute values of the glyphs of the input font. A custom instance of a variable font is generated by modifying a value of a design axis of the variable font based on the attribute values (block 404). The similarity module 110 generates the custom instance of the variable font in one example.

A similarity score describing a visual similarity between the custom instance of the variable font and the input font is determined (block 406). The computing device 102 implements the similarity module 110 to determine the similarity score. An additional design axis of the variable font is identified based on the similarity score (block 408). The similarity module 110 identifies the additional design axis as having values which correspond to a high absolute value of correlation with the similarity score one example. An instance of the variable font that is visually similar to the input font is generated by modifying a value of the additional design axis (block 410). For example, the similarity module 110 generates the instance of the variable font that is visually similar to the input font.

Figure 5:
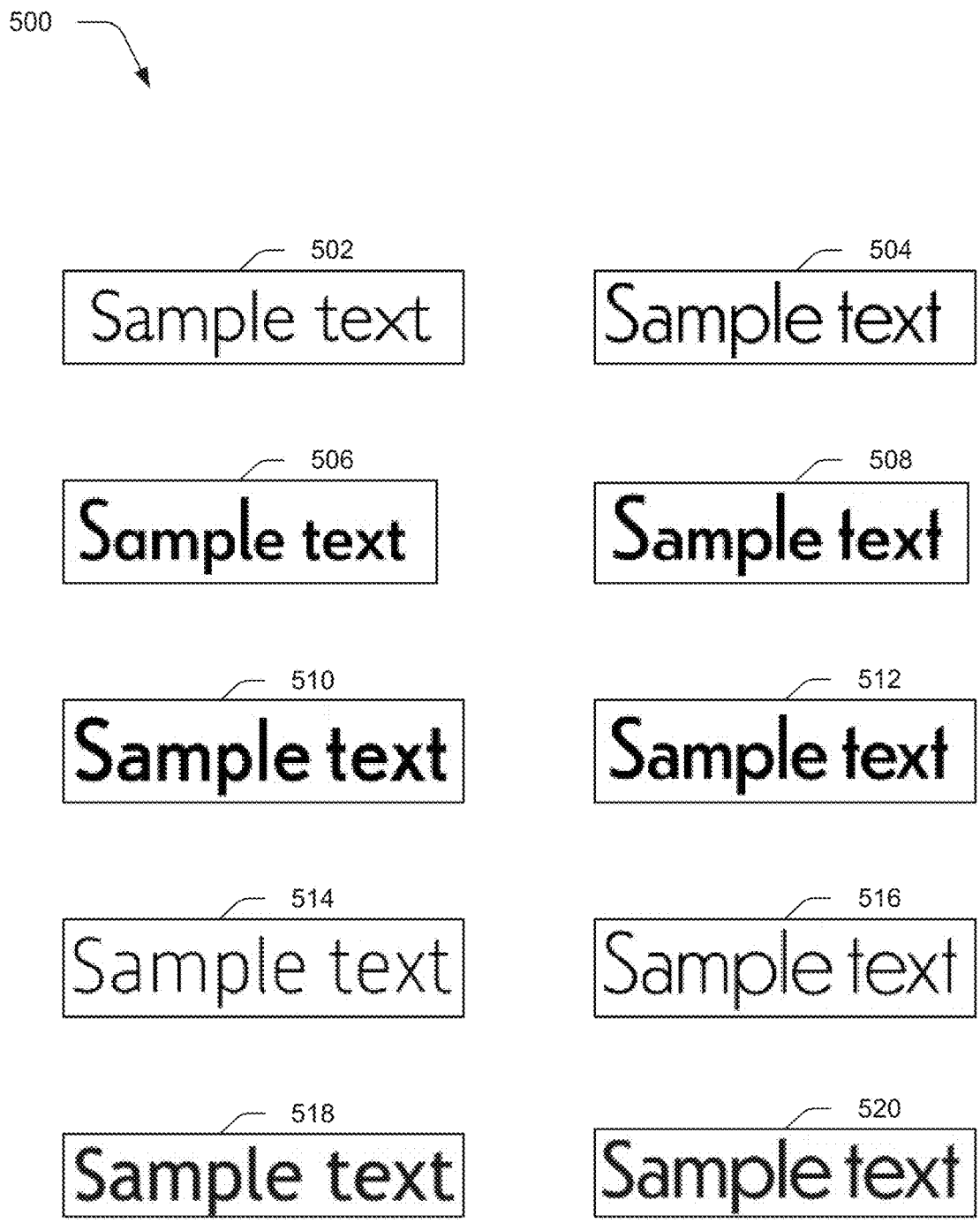
FIG. 5 illustrates an example of generated instances of a variable font that are visually similar to example input fonts.

FIG. 5 illustrates an example 500 of generated instances of a variable font that are visually similar to example input fonts. As shown, the example 500 includes glyphs rendered using a first input font 502 and a generated instance of a variable font 504 that is visually similar to the first input font 502. In this example, the first input font 502 is Gill Sans Light and the generated instance of the variable font 504 is Dunbar Series AP having a weight value of 64 and an xheight value of 454. For example, the similarity module 110 modifies a value of a Weight axis of the variable font based on attributes of glyphs of the input font 502. The similarity module 110 generates a similarity score between the input font 502 and an instance of the variable font having the modified value of the Weight axis. The similarity module 110 identifies an xHeight axis as having a high absolute correlation with this similarity score and determines the xHeight axis value as maximizing the similarity score. The similarity module 110 generates the instance of the variable font 504 as having the weight value of 64 and the xheight value of 454.

The example 500 also includes glyphs rendered using a second input font 506 and a generated instance of a variable font 508 that is visually similar to the second input font 506. For example, the similarity module 110 generates the instance of the variable font 508 based on values of glyph attributes of the second input font 506. As illustrated, the second input font 506 is Le Havre Regular and the generated instance of the variable font 508 is Dunbar Series AP having a weight value of 98 and an xheight value of 353. Although the first input font 502 and the second input font 506 are not visually similar, the similarity module 110 generates instances of a single variable font (e.g., Dunbar Series AP) that are visually similar to the first input font 502 and the second input font 506.

As shown, the example 500 includes glyphs rendered using a third input font 510, a generated instance of a variable font 512 that is visually similar to the third input font 510, glyphs rendered using a fourth input font 514, a generated instance of a variable font 516 that is visually similar to the fourth input font 514, glyphs rendered using a fifth input font 518, and a generated instance of a variable font 520 that is visually similar to the fifth input font 518. For example, the third input font 510 is Nobel Regular and the generated instance of the variable font 512 is Dunbar Series AP having a weight value of 109 and an xheight value of 417. The fourth input font 514 is Alwyn Thin and the generated instance of the variable font 516 that is visually similar to the forth input font 514 is Dunbar Series AP having a weight value of 51 and an xheight value of 483. As illustrated, the fifth input font 518 is Trebuchet MS Regular and the generated instance of the variable font is Dunbar Series AP having a weight value of 91 and an xheight value of 516.

Accordingly, the similarity module 110 is capable of generating instances of a single variable font (e.g., Dunbar Series AP) which are visually similar to a variety of other fonts (e.g., Gill Sans Light, Le Havre Regular, Nobel Regular, Alwyn Thin, and Trebuchet MS Regular). In the illustrated example, the similarity module 110 generates instances of the single variable font by modifying values of two design axes (e.g., weight and xheight). The similarity module 110 can also generate instances of a variable font by modifying values of a single design axis or a plurality of additional design axes. For example, the similarity module 110 generates instances of a variable font by modifying values of registered design axes (e.g., Italic, Optical Size, Slant, Width, and/or Weight) and/or unregistered design axes (e.g., non-standard, unregistered, and/or custom).

In another example, the similarity module 110 prioritizes an order of design axes for modification such that a value of a first design axis is modified before a value of a second design axis is modified. In this example, the similarity module 110 prioritizes the order of design axes for modification such that the values of the first and second design axes are modified before a value of a third design axis is modified. For example, the similarity module 110 prioritizes an order of registered design axes such that a value of a Weight axis is determined, then a value of a Width axis is determined, and then a value of a Slant axis is determined. Accordingly, the similarity module 110 is capable of generating instances of variable fonts which are visually similar to many other fonts having a variety of visual features.

FIG. 6 is a flow diagram depicting a procedure 600 in an example implementation in which a digital image depicting glyphs rendered using an input font is received and an instance of a variable font is generated that is visually similar to the input font. A digital image depicting glyphs rendered using an input font is received (block 602). The computing device 102 implements the similarity module 110 to receive the digital image in one example. Attribute values of the glyphs depicted in the digital image are determined (block 604). The similarity module 110 determines the attribute values of the glyphs depicted in the digital image.

A custom instance of a variable font is generated by modifying a value of a design axis of the variable font based on the attribute values (block 606). For example, the design axis is a registered design axis of the variable font. In one example, the computing device 102 implements the similarity module 110 to generate the custom instance of the variable font. A similarity score indicating a visual similarity between the custom instance of the variable font and the input font is determined (block 608). For example, the similarity module 110 determines the similarity score.

An additional design axis of the variable font is identified based on the similarity score (block 610). The computing device 102 implements the similarity module 110 to identify the additional design axis in an example. An instance of the variable font is generated that is visually similar to the input font by modifying a value of the additional design axis (block 612). For example, the similarity module 110 generates the instance of the variable font that is visually similar to the input font.

Figure 7:
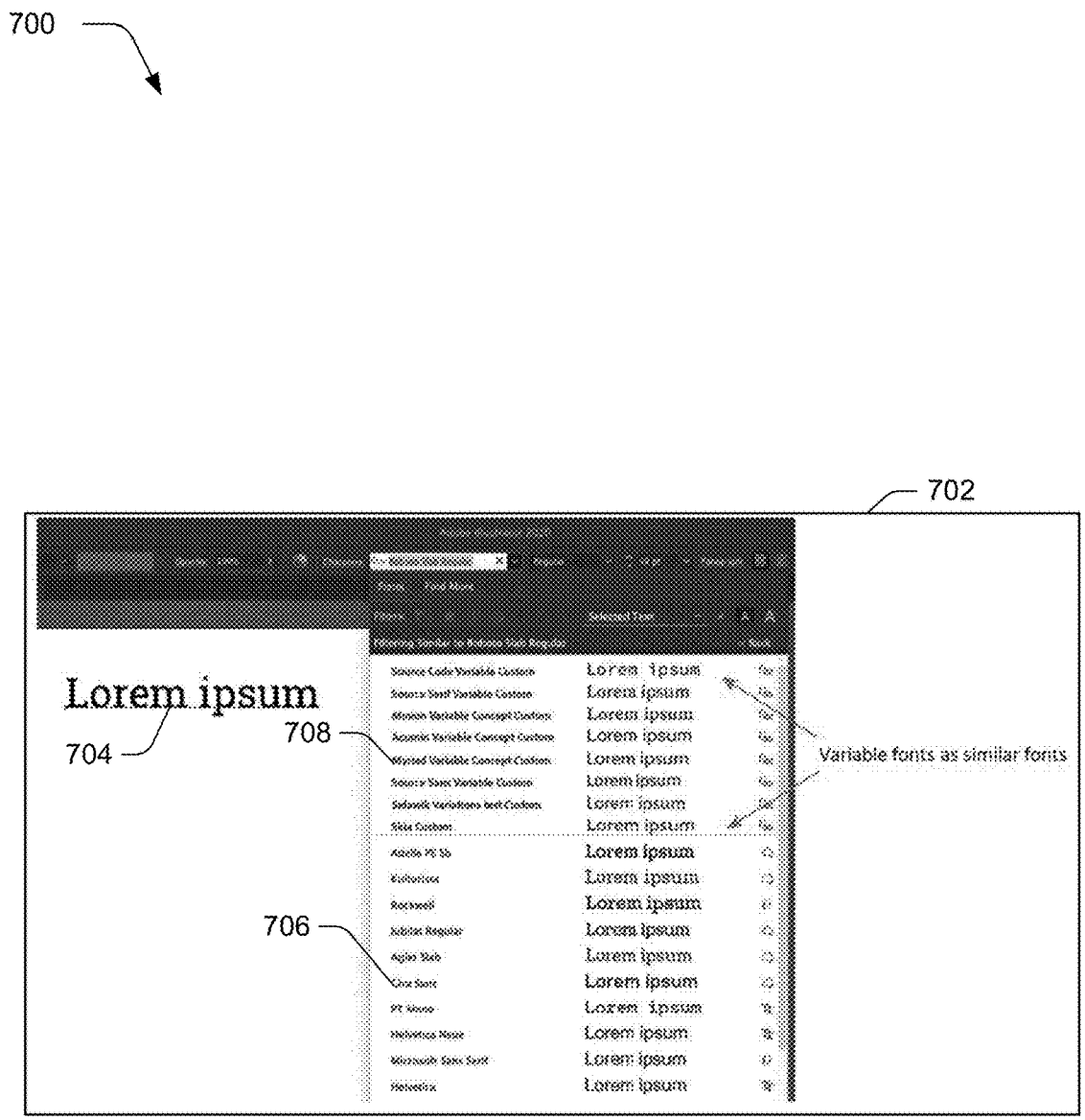
FIG. 7 illustrates an example of a user interface in which instances of variable fonts are identified as being visually similar to an input font.

FIG. 7 illustrates an example 700 of a user interface 702 in which instances of variable fonts are identified as being visually similar to an input font 704. As shown in the example 700, glyphs of the input font 704 are rendered in the user interface 702. An indication of a similar font 706 is displayed in a menu of the user interface 702 which identifies the similar font as being visually similar to the input font 704. An indication of an instance of a variable font 708 is also displayed in the menu of the user interface 702 which identifies the instance of the variable font as being visually similar to the input font 704. In this example, the instance of the variable font is usable in place of the similar font or in addition to the similar font.

As illustrated in the example 700, instances of variable fonts are displayed as visually similar fonts to a particular font. The particular font can be a variable font or a non-variable font. As shown, an instance of a locally available variable font is used render glyphs that are visually similar to glyphs rendered using the particular font, for example, if another font that is visually similar to the particular font is not available locally to the computing device 102. For example, instances of variable fonts are associated with other fonts as being visually similar to the other fonts. These instances of variable fonts are usable in addition to the other fonts, in place of the other fonts, and so forth.

Example System and Device

Figure 8:
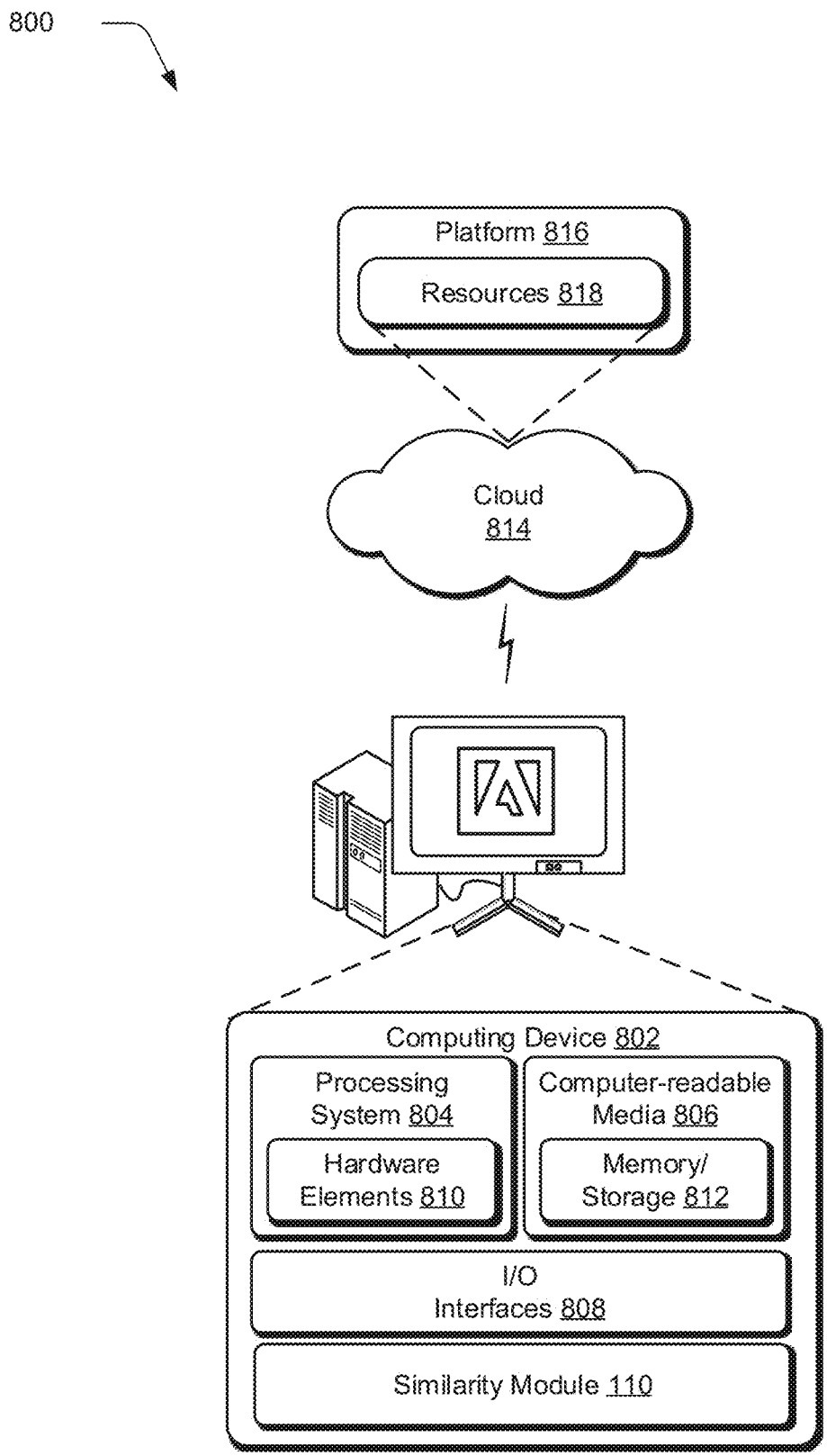
FIG. 8 illustrates an example system that includes an example computing device that is representative of one or more computing systems and/or devices that may implement the various techniques described herein.

FIG. 8 illustrates an example system 800 that includes an example computing device that is representative of one or more computing systems and/or devices that may implement the various techniques described herein. This is illustrated through inclusion of the similarity module 110. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data.

Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources 818 and functions to connect the computing device 802 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although implementations of systems for generating instances of variable fonts have been described in language specific to structural features and/or methods, it is to be understood that the appended claims are not necessarily limited to the specific features or methods described. Rather, the specific features and methods are disclosed as example implementations of systems for generating instances of variable fonts, and other equivalent features and methods are intended to be within the scope of the appended claims. Further, various different examples are described and it is to be appreciated that each described example can be implemented independently or in connection with one or more other described examples.

What is claimed is:

1. In a digital medium environment to automatically generate an instance of a variable font that is visually similar to an input font, a method implemented by a computing device, the method comprising:
   receiving, by an attribute module, input data describing attribute values of glyphs of the input font;
   generating, by an axis module, a custom instance of the variable font by modifying a value of a design axis of the variable font based on the attribute values;
   determining, by a similarity module, a similarity score describing a visual similarity between the custom instance of the variable font and the input font based on a Euclidean distance between a feature vector describing a visual appearance of the input font and a feature vector describing a visual appearance of the custom instance of the variable font;
   identifying, by the similarity module, an additional design axis of the variable font as having a higher absolute value of correlation with the similarity score than the design axis;
   generating, by a modification module, the instance of the variable font by modifying a value of the additional design axis; and
   outputting, by an output module, the instance of the variable font for display in a user interface.

2. The method as described in claim 1, wherein the design axis is a registered design axis of the variable font.

3. The method as described in claim 2, wherein the additional design axis is not a registered design axis of the variable font.

4. The method as described in claim 2, further comprising determining linear relationships between the attribute values of the glyphs of the input font and values of the registered design axis.

5. The method as described in claim 4, wherein the linear relationships are dependent on a number of masters included in the variable font.

6. The method as described in claim 1, wherein the attribute values of the glyphs of the input font include at least one of a weight, a width, or a slant.

7. The method as described in claim 1, wherein the input font is a non-variable font.

8. The method as described in claim 1, wherein the input font is an additional variable font.

9. One or more computer-readable storage media comprising instructions stored thereon that, responsive to execution by a computing device, causes the computing device to perform operations including:
receiving a digital image depicting glyphs rendered using an input font;
determining attribute values of the glyphs depicted in the digital image;
generating a custom instance of a variable font by modifying a value of a design axis of the variable font based on the attribute values;
determining a similarity score indicating a visual similarity between the custom instance of the variable font and the input font based on a Euclidean distance between a feature vector describing a visual appearance of the input font and a feature vector describing a visual appearance of the custom instance of the variable font;
identifying an additional design axis of the variable font as having a higher absolute value of correlation with the similarity score than the design axis; and
generating an instance of the variable font that is visually similar to the input font by modifying a value of the additional design axis.

10. The one or more computer-readable storage media as described in claim 9, wherein the operations further include determining linear relationships between the attribute values of the glyphs rendered using the input font and values of the design axis.

11. The one or more computer-readable storage media as described in claim 9, wherein the input font is a non-variable font.

12. The one or more computer-readable storage media as described in claim 9, wherein the input font is an additional variable font.

13. The one or more computer-readable storage media as described in claim 9, wherein the design axis is a registered design axis of the variable font.

14. The one or more computer-readable storage media as described in claim 9, wherein the design axis is not a registered design axis of the variable font.

15. A system comprising:
a processing system; and
a computer-readable storage medium having instructions stored thereon that, responsive to execution by the processing system, causes the processing system to perform operations including:
receiving input data describing an input font;
determining attribute values of glyphs of the input font;
generating a custom instance of a variable font by modifying a value of a registered design axis of the variable font based on the attribute values;
determining a similarity score describing a visual similarity between the custom instance of the variable font and the input font based on a Euclidean distance between a feature vector describing a visual appearance of the input font and a feature vector describing a visual appearance of the custom instance of the variable font;
identifying an additional design axis of the variable font as having a higher absolute value of correlation with the similarity score than the registered design axis; and
generating an instance of the variable font that is visually similar to the input font by modifying a value of the additional design axis.

16. The system as described in claim 15, wherein the additional design axis is an additional registered design axis of the variable font.

17. The system as described in claim 15, wherein the additional design axis is not a registered design axis of the variable font.

18. The system as described in claim 15, wherein the input font is a non-variable font.

19. The system as described in claim 15, wherein the input font is an additional variable font.

20. The system as described in claim 15, wherein the operations further include determining linear relationships between the attribute values of the glyphs rendered using the input font and values of the registered design axis.

* * * * *